US010007768B2

(12) United States Patent
Daniel

(10) Patent No.: US 10,007,768 B2
(45) Date of Patent: *Jun. 26, 2018

(54) SYSTEM AND METHOD FOR DISTRIBUTING BROADCAST MEDIA BASED ON A NUMBER OF VIEWERS

(71) Applicant: Isaac S. Daniel, Miramar, FL (US)

(72) Inventor: Isaac S. Daniel, Miramar, FL (US)

(73) Assignee: Isaac Daniel Inventorship Group LLC

(*) Notice: Subject to any disclaimer, the term of this patent is extended or adjusted under 35 U.S.C. 154(b) by 702 days.

This patent is subject to a terminal disclaimer.

(21) Appl. No.: 13/741,311

(22) Filed: Jan. 14, 2013

(65) Prior Publication Data

US 2013/0132271 A1    May 23, 2013

Related U.S. Application Data

(63) Continuation-in-part of application No. 12/689,158, filed on Jan. 18, 2010, now Pat. No. 8,613,008, and a
(Continued)

(51) Int. Cl.
*G06F 21/10* (2013.01)
*G06Q 20/22* (2012.01)
(Continued)

(52) U.S. Cl.
CPC .......... *G06F 21/10* (2013.01); *G06Q 20/22* (2013.01); *G06Q 20/3433* (2013.01); *H04H 20/78* (2013.01); *H04N 7/10* (2013.01); *H04N 7/16* (2013.01); *H04N 7/162* (2013.01); *H04N 7/163* (2013.01); *H04N 7/165* (2013.01); *H04N 7/17309* (2013.01); *H04N 7/17318* (2013.01);
(Continued)

(58) Field of Classification Search
None
See application file for complete search history.

(56) References Cited

U.S. PATENT DOCUMENTS

| 4,994,908 A | * | 2/1991 | Kuban | ............... G08B 5/221 |
| | | | | 348/E5.105 |
| 5,331,353 A | * | 7/1994 | Levenson | ............... H04N 5/44 |
| | | | | 348/E5.096 |

(Continued)

OTHER PUBLICATIONS

PCT International Search Report, PCT/US2011/020869, dated Jul. 18, 2011, 5 pages, European Patent Office, International Searching Authority.

*Primary Examiner* — Jonathan V Lewis
(74) *Attorney, Agent, or Firm* — Isaac Daniel Group Inc.

(57) ABSTRACT

A system and method related thereto that includes a processor, and computer executable instructions readable by the processor and operative to provide media content for selection, provide a license for selection, wherein the license is associated with the media content, receive a selection of the media content or the license, use a sensor to determine a number of persons that are capable of perceiving the media content, and control the media content based on the number of persons that is determined to be capable of perceiving the media content, wherein controlling the media content includes any or all of the following: ceasing to play the media content, pausing the media content, playing the media content, or continuing to play the media content.

21 Claims, 15 Drawing Sheets

Related U.S. Application Data continuation-in-part of application No. 12/702,762, filed on Feb. 9, 2010, now Pat. No. 8,355,951, and a continuation-in-part of application No. 12/704,332, filed on Feb. 11, 2010, now abandoned, and a continuation-in-part of application No. 12/626,817, filed on Nov. 27, 2009, now Pat. No. 8,354,930.

(51) Int. Cl.
    *H04N 7/16* (2011.01)
    *H04N 7/173* (2011.01)
    *H04N 7/10* (2006.01)
    *H04N 21/84* (2011.01)
    *H04N 21/472* (2011.01)
    *H04N 21/45* (2011.01)
    *H04H 20/78* (2008.01)
    *G06Q 20/34* (2012.01)

(52) U.S. Cl.
    CPC ..... *H04N 7/17354* (2013.01); *H04N 21/4532* (2013.01); *H04N 21/47202* (2013.01); *H04N 21/84* (2013.01)

(56) References Cited

U.S. PATENT DOCUMENTS

| | | | |
|---|---|---|---|
| 5,381,155 A * | 1/1995 | Gerber | G08G 1/017 340/936 |
| 5,646,676 A * | 7/1997 | Dewkett | H04N 7/148 348/E5.008 |
| 5,793,409 A * | 8/1998 | Tetsumura | G01S 15/025 725/10 |
| 6,311,214 B1 * | 10/2001 | Rhoads | G06F 17/30876 380/255 |
| 6,317,881 B1 * | 11/2001 | Shah-Nazaroff | H04H 60/33 348/E7.075 |
| 6,508,709 B1 * | 1/2003 | Karmarkar | G07F 17/32 463/40 |
| 6,950,534 B2 | 9/2005 | Cohen et al. | |
| 7,134,130 B1 * | 11/2006 | Thomas | 725/25 |
| 7,478,069 B1 * | 1/2009 | Ritter | G06Q 20/3674 705/34 |
| 7,814,023 B1 * | 10/2010 | Rao | G06F 21/10 705/50 |
| 8,078,290 B2 | 12/2011 | Nelson | |
| 8,302,127 B2 * | 10/2012 | Klarfeld | G11B 27/105 705/14.66 |
| 8,549,550 B2 * | 10/2013 | Lopatecki | G06F 15/16 725/10 |
| 8,572,411 B2 * | 10/2013 | Ginter | G06F 21/10 345/59 |
| 8,595,853 B2 * | 11/2013 | Baks | G06F 21/10 380/247 |
| 2003/0005439 A1 * | 1/2003 | Rovira | H04N 7/163 725/37 |
| 2003/0025995 A1 * | 2/2003 | Redert | H04N 13/0404 359/464 |
| 2003/0097563 A1 * | 5/2003 | Moroney et al. | 713/170 |
| 2003/0097655 A1 * | 5/2003 | Novak | 725/31 |
| 2004/0221303 A1 * | 11/2004 | Sie | G06Q 30/02 725/29 |
| 2004/0222047 A1 | 11/2004 | Difranza | |
| 2005/0073576 A1 * | 4/2005 | Andreyko et al. | 348/51 |
| 2005/0160258 A1 * | 7/2005 | O'Shea | G06K 9/00664 713/154 |
| 2005/0268115 A1 * | 12/2005 | Barde | G06F 21/10 713/189 |
| 2006/0136962 A1 | 6/2006 | Masaki | |
| 2006/0167808 A1 * | 7/2006 | Greene | G06Q 99/00 705/59 |
| 2006/0179488 A1 * | 8/2006 | Kokumai | G11B 20/00086 726/27 |
| 2006/0198313 A1 * | 9/2006 | Kitamura | H04L 12/2602 |
| 2007/0067852 A1 * | 3/2007 | James | G06F 21/35 726/28 |
| 2007/0261095 A1 * | 11/2007 | Petrisor et al. | 725/131 |
| 2008/0046930 A1 * | 2/2008 | Smith et al. | 725/46 |
| 2008/0134102 A1 | 6/2008 | Movold et al. | |
| 2008/0148306 A1 * | 6/2008 | Mutual | H04L 12/5695 725/1 |
| 2008/0170700 A1 * | 7/2008 | Darba | G06F 21/10 380/278 |
| 2008/0244639 A1 * | 10/2008 | Kaaz | 725/34 |
| 2009/0007220 A1 * | 1/2009 | Ormazabal | H04L 63/107 726/1 |
| 2009/0079813 A1 | 3/2009 | Hildreth | |
| 2009/0092284 A1 | 4/2009 | Breed et al. | |
| 2009/0228985 A1 * | 9/2009 | Maurer | G06Q 30/06 726/26 |
| 2009/0312093 A1 * | 12/2009 | Walker | G07F 17/32 463/25 |
| 2010/0107184 A1 * | 4/2010 | Shintani | H04N 21/4436 725/10 |
| 2010/0125362 A1 * | 5/2010 | Canora | G06Q 20/3278 700/236 |
| 2010/0128931 A1 * | 5/2010 | Bongard | G07B 15/00 382/105 |
| 2010/0185341 A1 | 7/2010 | Wilson et al. | |
| 2010/0325646 A1 * | 12/2010 | Alhadeff | G06Q 30/02 725/10 |
| 2011/0067028 A1 * | 3/2011 | Cozart | G06F 21/10 718/101 |
| 2012/0137322 A1 * | 5/2012 | Kushalnagar et al. | 725/31 |
| 2012/0278904 A1 | 11/2012 | Perez et al. | |
| 2013/0019002 A1 * | 1/2013 | Heileman | G06F 21/10 709/223 |
| 2013/0117078 A1 * | 5/2013 | Weik, III | G06Q 10/00 705/13 |

* cited by examiner

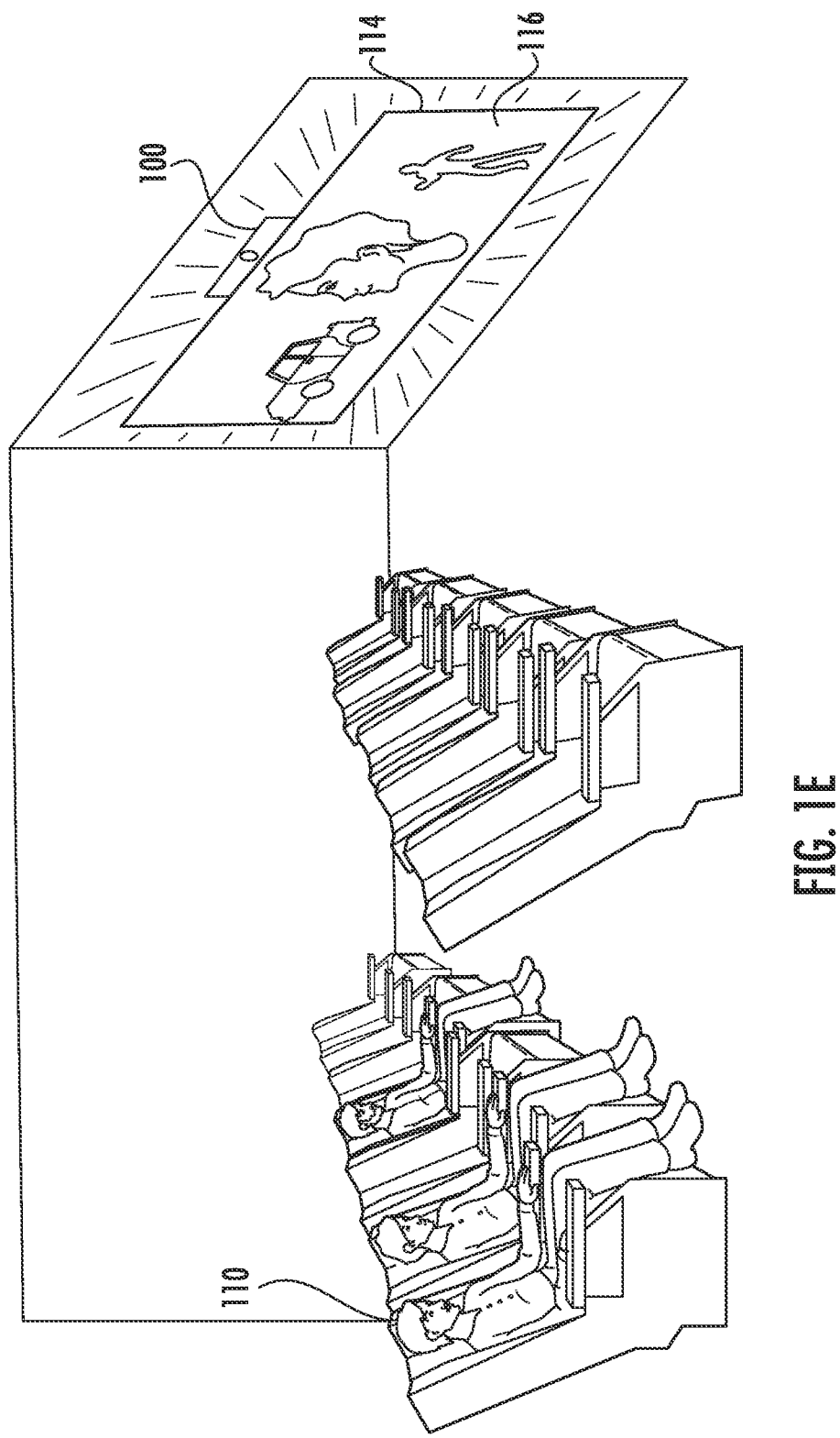

US 10,007,768 B2

SYSTEM AND METHOD FOR DISTRIBUTING BROADCAST MEDIA BASED ON A NUMBER OF VIEWERS

PRIORITY CLAIM

This patent application is a continuation-in-part patent application and claims priority to U.S. Non-Provisional patent application Ser. No. 12/626,817, titled "Locator and Customer Service Apparatus and Method," filed on Nov. 27, 2009; U.S. Non-Provisional patent application Ser. No. 12/689,158, titled "System and Method for Broadcasting Media," filed Jan. 18, 2010; U.S. Non-Non-Provisional patent application Ser. No. 12/702,762, titled "System and Method for Monetizing Broadcast Media Based on The Number of Viewers," filed Feb. 9, 2010; and U.S. Non-Provisional patent application Ser. No. 12/704,332, titled "System and Method for Administering Remote Content," filed Feb. 11, 2010, all of which are hereby incorporated by reference as if fully stated herein.

FIELD

The present disclosure relates generally to electronic systems, and more particularly, to systems, methods, and various other disclosures related to broadcasting and playing media.

BACKGROUND

It is common practice for companies to issue site licenses to perceive certain broadcasted programs, such as movies, sports, and the like. Often site licenses contain limitations as to how many persons are allowed to watch the program. Thus far, the only way to ensure that the number of persons watching the program corresponds to the number of persons contained in the license is to physically limit how many persons may perceive the program. For example, only a certain amount of persons are allowed to enter a movie theatre, and the persons that are allowed in are limited to the persons who hold a ticket. The same goes for live sports events or other types of entertainment and educational events. Traditionally, there has been no way to monitor, nor limit the number of persons who watch a program at a remote location, such as a home or office, and thus site licenses have been difficult to enforce in remote locations.

Additionally, many companies refuse to allow individual persons to perceive new releases of programs, such as movie premiers and the like, because there is no way to ensure that only authorized persons will perceive the program.

SUMMARY

The various systems, methods, and embodiments described herein result from the realization that the number of persons who are perceiving a broadcasted program may be checked to see if it coincides with the number of persons in a license, by providing a system and method for determining how many persons and/or the identity of the persons that are perceiving the program.

Accordingly, the various embodiments and disclosures described herein solve the limitations of the prior art in a new and novel manner.

BRIEF DESCRIPTION OF THE DRAWINGS

FIGS. 1A through 1E show a system in accordance with various embodiments;

DETAILED DESCRIPTION OF PREFERRED EMBODIMENTS

Figure 1A:
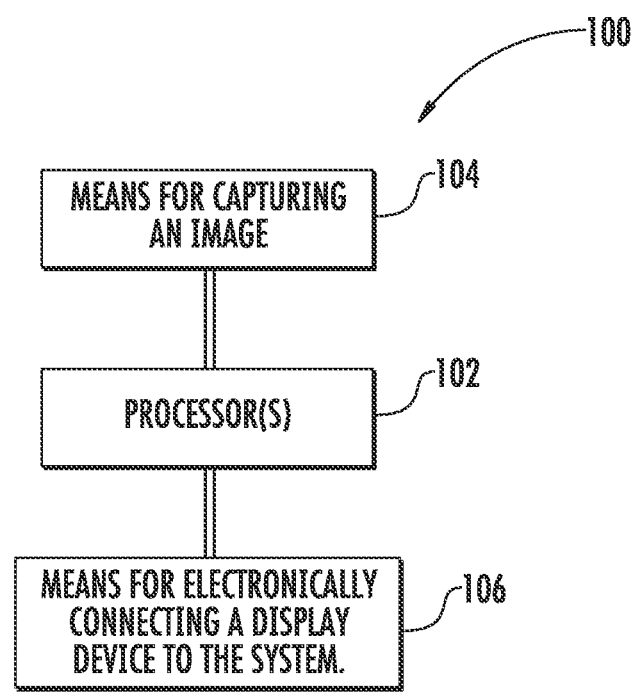

FIGS. 1A through 1E show a system 100 in accordance with some embodiments. In one embodiment, as shown in FIG. 1A, system 100 comprises at least one processor 102, at least one means for capturing an image 104 (image shown with reference to numeral 108 in FIG. 1C), wherein the at least one means for capturing an image 104 may be electronically connected to the at least one processor, at least one means for electronically connecting a display device to the system 106, wherein the means for electronically connecting a display device may be electronically connected to the at least one processor, and computer executable instructions (not shown) readable by the at least one processor and operative to analyze at least one image captured by the at least one means for capturing an image, determine the number of persons (shown as 110 in FIG. 1C) that are in the at least one image, and control the content (shown as 116 in FIG. 1C) displayed on at least one display device connected to the system based on how many persons are determined to be in the at least one image.

The terms "electronically connected," "electronic connection," and the like, as used throughout the present disclosure, are intended to describe any kind of electronic connection or electronic communication, such as, but not limited to, a physically connected or wired electronic connection and/or a wireless electronic connection.

In some embodiments, the at least one processor 102 may be any kind of processor, including, but not limited to, a single core processor, a multi core processor, a video processor, and the like.

The means for capturing an image 104 may be any such means, such as, but not limited to, a camera, an infrared camera, a thermal imaging camera, a video sensor, a digital camera, a 3D camera, and the like. In some embodiments, means for capturing an image 104 may include a 3D sensor, such as a time of flight sensor or structured light sensor, which may include any of those various embodiments developed or produced by Optrima N V, Witherenstraat 4—1040 Brussels, Belgium; Prime Sense, 28 Habarzel St., 4$^{th}$ Floor, Tel-Aviv, 69710, Israel; PMDTechnologies GmbH, Am Eichenlag 50, D-57076 Siegen, Germany; and Microsoft, Corp., One Microsoft Way, Redmond, Wash., USA. The means for capturing an image 104 may include a flash, which may be used to illuminate the subjects in the image. In preferred embodiments, the means for capturing an image 104 may include a field of view 118 that encompasses the same field of view as the display device 114 that may be connected to system 100.

Figure 1B:
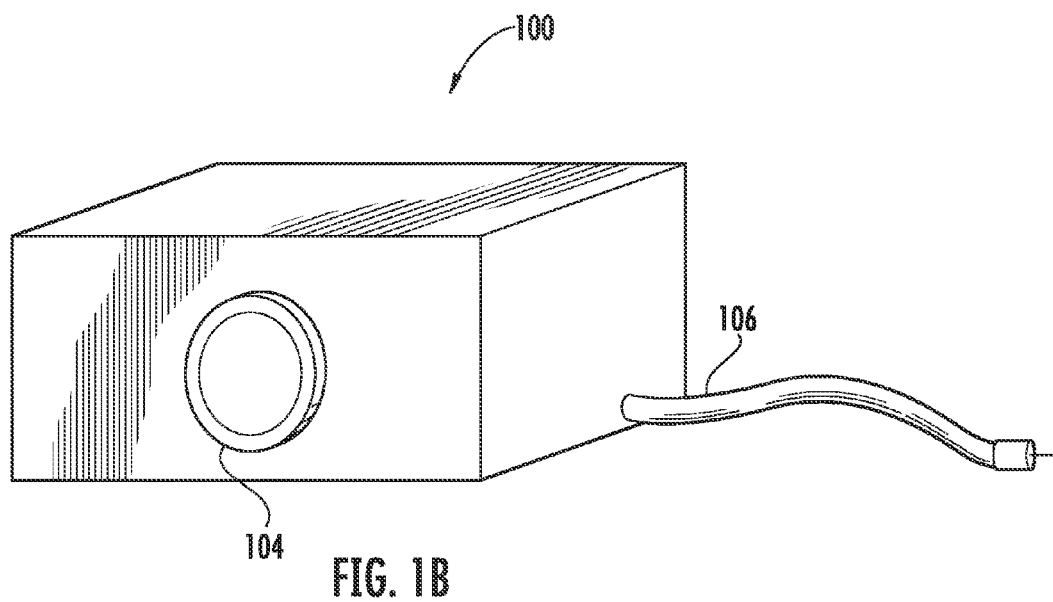

In some embodiments, the at least one means for electronically connecting a display device to the system 106 may be any kind of means, such as a video connector, a coaxial cable, an HDMI cable, an s-video component connector, a Wi-Fi video transceiver, a Bluetooth video transceiver, an internal video cable socket, a DVI connector, and the like. In FIG. 1B, means for electronically connecting a display device to the system 106 is shown to include a cable, but it should be noted that means 106 may include, or may not include a cable. The display device may be any kind of display device, such as, but not limited to, a television, a computer monitor, a projector, or any other kind of screen and/or display device.

The computer executable instructions may be loaded directly on the processor, or may be stored in a storage means, such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. The computer executable instructions may be any type of computer executable instructions, which may be in the form of a computer program, the program being composed in any suitable programming language or source code, such as C++, C, JAVA, JavaScript, HTML, XML, and other programming languages.

In one embodiment, the computer executable instructions may include image recognition software and/or firmware, which may be used to analyze the images captured and to determine the number of persons present in the image, and consequently in the image capturing means field of view. Such image recognition software may include facial recognition software, or may simply include general object recognition software.

The terms "object recognition software," "facial recognition software," and "image recognition software," as used throughout the present disclosure, may refer to the various embodiments of object recognition software known in the art, including, but not limited to, those embodiments described in the following publications: *Reliable Face Recognition Methods: System Design, Implementation, and Evaluation,* by Harry Wechsler, Copyright 2007, Published by Springer, ISBN-13: 978-0-387-22372-8; *Biometric Technologies and Verification Systems,* by John Vacca, Copyright 2007, Elsevier, Inc., Published by Butterworth-Heinemann, ISBN-13: 978-0-7506-7967-1; and *Image Analysis and Recognition,* edited by Aurelio Campilho and Mohamed Kamel, Copyright 2008, Published by Springer, ISBN-13: 978-3-540-69811-1, *Eye Tracking Methodology: Theory and Practice,* by Andrew T. Duchowski, Copyright 2007, Published by Springer, ISBN 978-1-84628-608-7, all of which are herein incorporated by reference. In one embodiment, the object recognition software may comprise 3D sensor middleware, which may include 3D gesture control and/or object recognition middle ware, such as those various embodiments produced and developed by Softkinetic S. A., 24 Avenue L. Mommaerts, Brussels, B-1140, Belgium, Microsoft Corp., One Microsoft Way, Redmond, Wash., USA, and Omek Interactive, 2 Hahar Street, Industrial Zone Har Tuv A, Ganir Center Beith Shemesh 99067, Israel.

In some embodiments, the computer executable instructions may be further operative to compare the number of persons 110 that are determined to be in the at least one image 108 with a number of persons that are authorized to view the content 116 displayed on the at least one display device 114. In some embodiments, the number of persons that are authorized to view the content may be contained in a license to view the content 116. In other embodiments, the number of persons that are authorized to the view the content 116 may be received from a remote station, such as a television or movie service provider, in communication with system 100. In yet other embodiments, the number of persons that are authorized to view the content 116 may be contained on a piece of media hardware, such as a DVD, CD, and the like.

In a further embodiment, the computer executable instructions may be operative to control the content 116 displayed on the at least one display device 114 if the number of persons 110 determined to be in the at least one image 114 exceeds the number of persons authorized to view the content 116 displayed on the at least one display device 114. In some embodiments, controlling the content 116 displayed on the at least one display device 114 includes, but is not limited to, ceasing to display the content 116, pausing the content 116, playing the content 116, or continuing to display the content 116. In some embodiments, for example, if at the outset of the content's 116 display, the number of persons 110 who are determined to be watching exceeds the number of persons authorized to watch, the content 116 may not even begin playing. In further embodiments, if the number of persons 110 watching the content 116 at the outset is in accordance with the number of persons authorized to view the content 116, but at a later time exceeds the number authorized, the computer executable instructions may pause, freeze, or cease displaying the content altogether 116. In a further embodiment, if the number of persons 110 watching the content 116 at first exceeds the number authorized, but then later is reduced to or below the number authorized, the computer executable instructions may begin or continue displaying the content 116. The content 116 may be any kind of content, such as, but not limited to, a movie, a television show, a sports broadcast, such as a sports event, news, educational content, and the like.

In a further embodiments, system 100 comprises at least one means for communication with a local device, wherein the means for communicating with the local device may be electronically connected to the at least one processor 102. In some embodiments, such means may include a Bluetooth™ module, a USB™ port, an infrared port, a network adapter, such as a Wi-Fi™ (WLAN) card, and the like. The local device may be any kind of device, such as a television, a computer, a remote control, a telephone, a portable digital assistant, and the like.

In yet another embodiment, system 100 further comprises at least one means for communicating with a remote station, wherein the means for communicating may be electronically connected to the at least one processor 102. In some embodiments, the means for communicating with a remote station may be any kind of means, such as, but not limited to, a wireless modem, such as a GSM modem, a wired modem, an Ethernet adapter, a Wi-Fi adapter, and the like. In some embodiments, the remote station may be a media service provider, such as, but not limited to, a television service provider, a movie provider, a sports media provider, an internet provider, a television station, a server computer, and the like. In such embodiments, the computer executable instructions may be further operative to use the at least one means for communicating with a remote station to transmit or receive information to or from the remote station. The information may include media content, such as television shows, sports broadcasts, movies, and the like. The information may also include how many persons are authorized to view the media content, billing information, and software updates. In some embodiments, a user, such as a person, may use system 100 to select and/or download the media to be viewed, and may select the amount of persons authorized to watch the media.

Figure 1C:
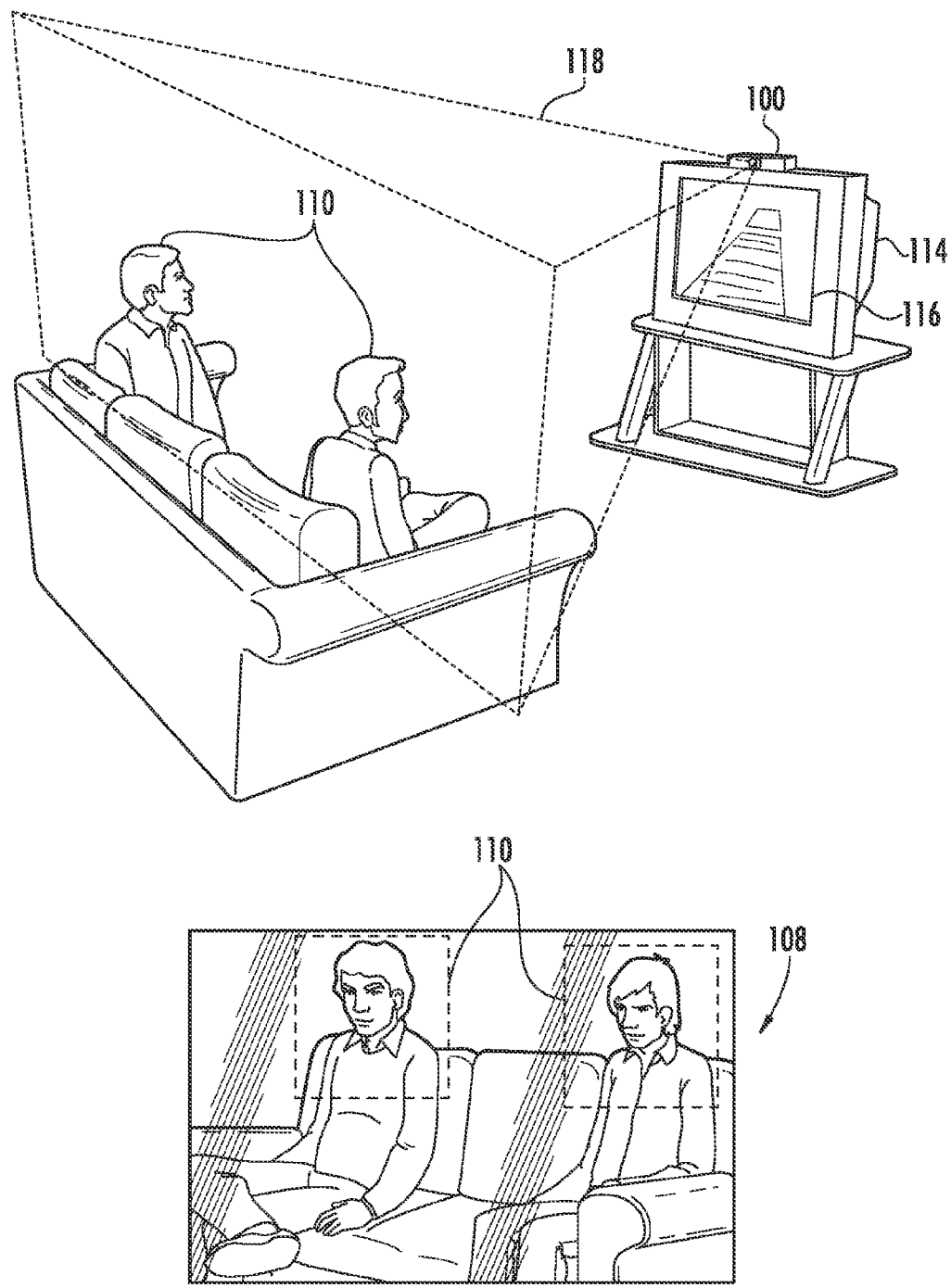
Figure 1D:
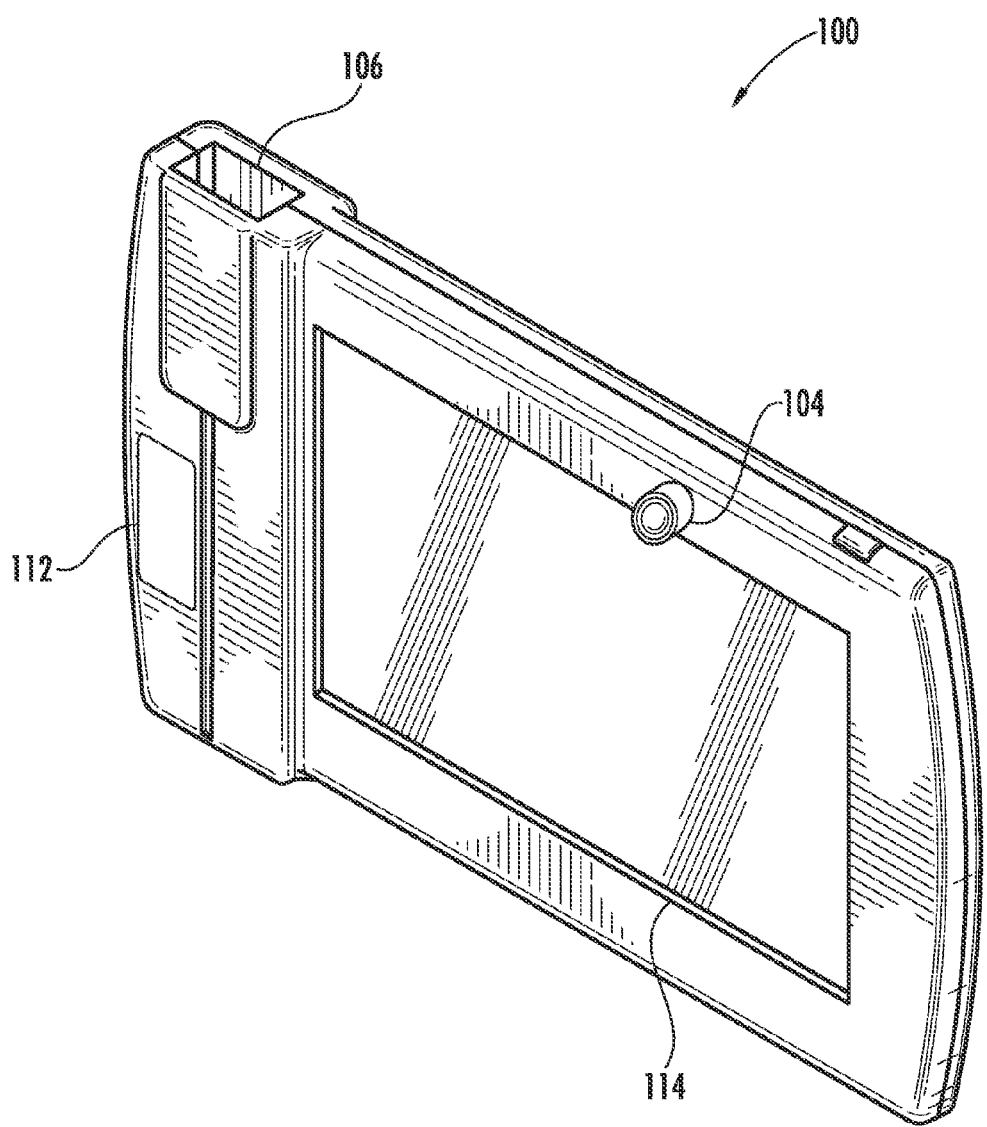

In one embodiment, system 100 may be positioned on or near a display device 114, such as a television or computer monitor (as shown in FIG. 1C). In other embodiments, system 100 may be positioned within, or integrated with a display device 114, such as a television, tablet computer (as shown in FIG. 1D), personal computer, laptop computer, and the like. In another embodiment, system 100 may be part of or positioned within a theatre, such as, but not limited to, a movie theatre (as shown in FIG. 1E), a home theatre, a hotel theatre, a mini theatre In some embodiments, system 100 may further comprise a means for receiving person input, which in some embodiments, may be any type of means, including, but not limited to: a telephone modem: a key pad, a key board, a remote control, a touch screen, a virtual keyboard, a mouse, a stylus, a microphone, a camera, a fingerprint scanner, and a retinal scanner. In a further embodiment, system 100 may include a biometric identification means 112 to identify the person perceiving the content, such as a fingerprint scanner, an eye scanner, and facial recognition software.

Figure 2A:
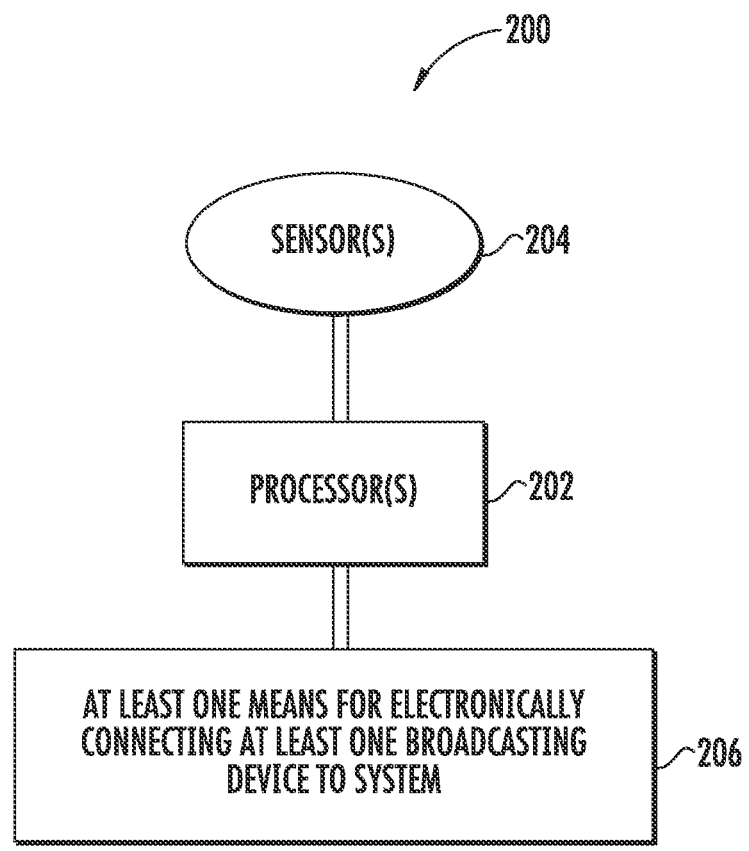
FIGS. 2A through 2E show a system in accordance with various embodiments.
Figure 2B:
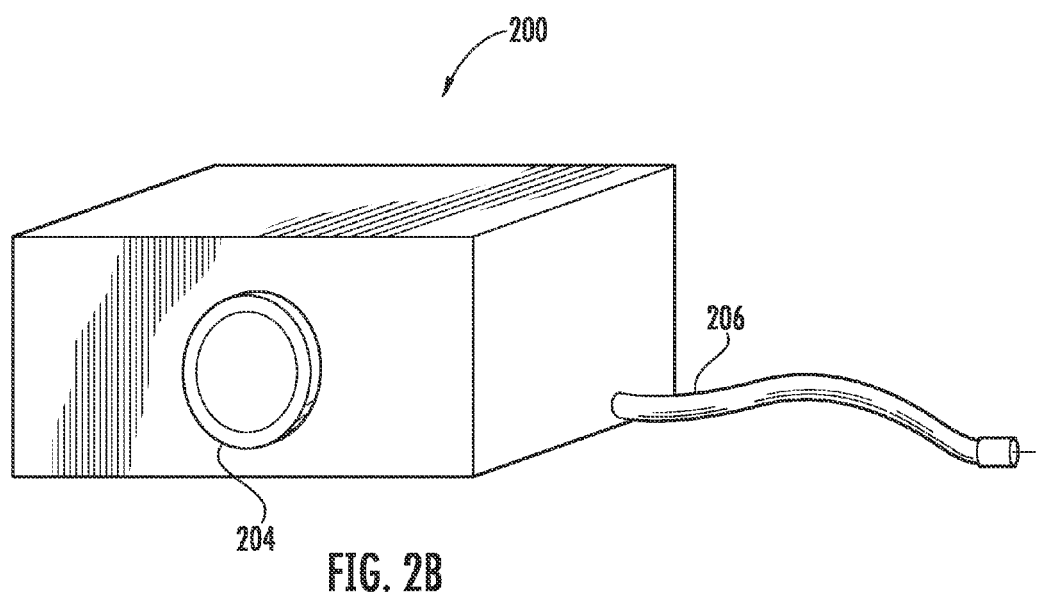

FIGS. 2A through 2E show system 200 in accordance with some embodiments. In one embodiment, as shown in FIG. 2A, system 200 comprises at least one processor 202, at least one sensor 204 electronically connected to at least one processor 202, and at least one means for electronically connecting at least one broadcasting device (shown as 208 in FIG. 2C) to the system 206, wherein the at least one means for electronically connecting at least one broadcasting device 206 may be electronically connected to at least one processor 202, and computer executable instructions (not shown) readable by at least one processor 202, and operative to use at least one sensor 204 to determine how many persons (shown as 210 in FIG. 2C) or the identity of a person that is capable of perceiving a content (shown as 212 in FIG. 1C) broadcasted through at least one broadcasting device 208 electronically connected to system 200.

In some embodiments, at least one processor 202 may be any kind of processor, including, but not limited to, at single core processor, a multi core processor, a video processor, and the like.

At least one sensor 204 may be any kind of sensor, including, but not limited to, a video sensor, such as a camera, a 3D camera, a motion sensor, and the like, an audio sensor, such as a microphone, a tactile sensor, such as a vibration sensor, a chemical sensor, such as an odor sensor, and the like, an electrical sensor, such as a capacitive sensor, a resistive sensor, and the like, and a thermal sensor, such as a heat sensor and/or infrared camera, and the like. In some embodiments, at least one sensor 204 may include a 3D sensor, such as a time of flight sensor or structured light sensor, which may include any of those various embodiments developed or produced by Optrima N V, Witherenstraat 4—1040 Brussels, Belgium; Prime Sense, 28 Habarzel St., 4$^{th}$ Floor, Tel-Aviv, 69710, Israel; PMDTechnologies GmbH, Am Eichenlag 50, D-57076 Siegen, Germany; and Microsoft, Corp., One Microsoft Way, Redmond, Wash., USA. At least one sensor 204 may be positioned in the same enclosure as at least one processor 202. Alternatively, at least one sensor 204 may be positioned remotely to at least one processor, such as near a couch, near a screen, or another location.

Figure 2C:
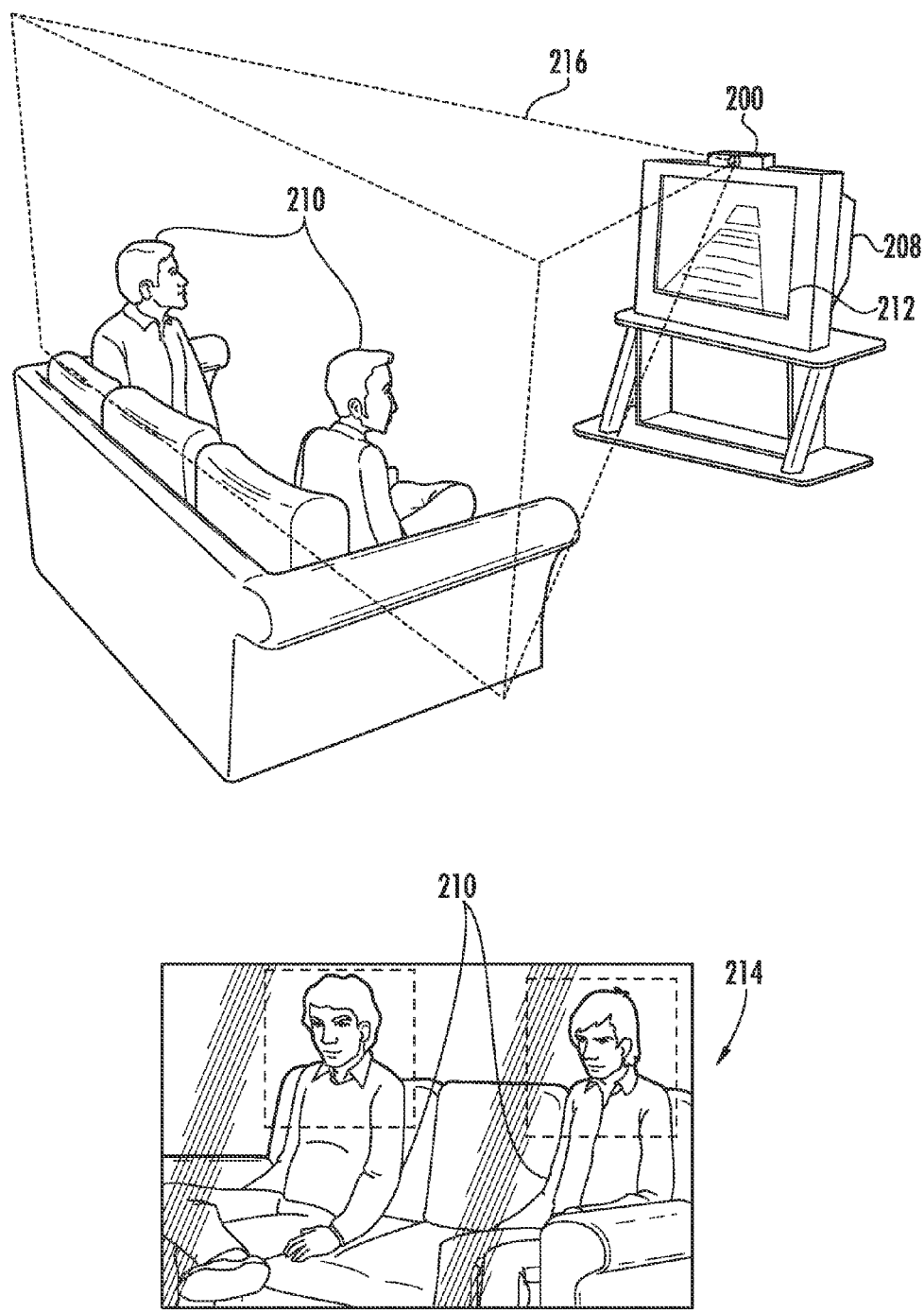
Figure 2D:
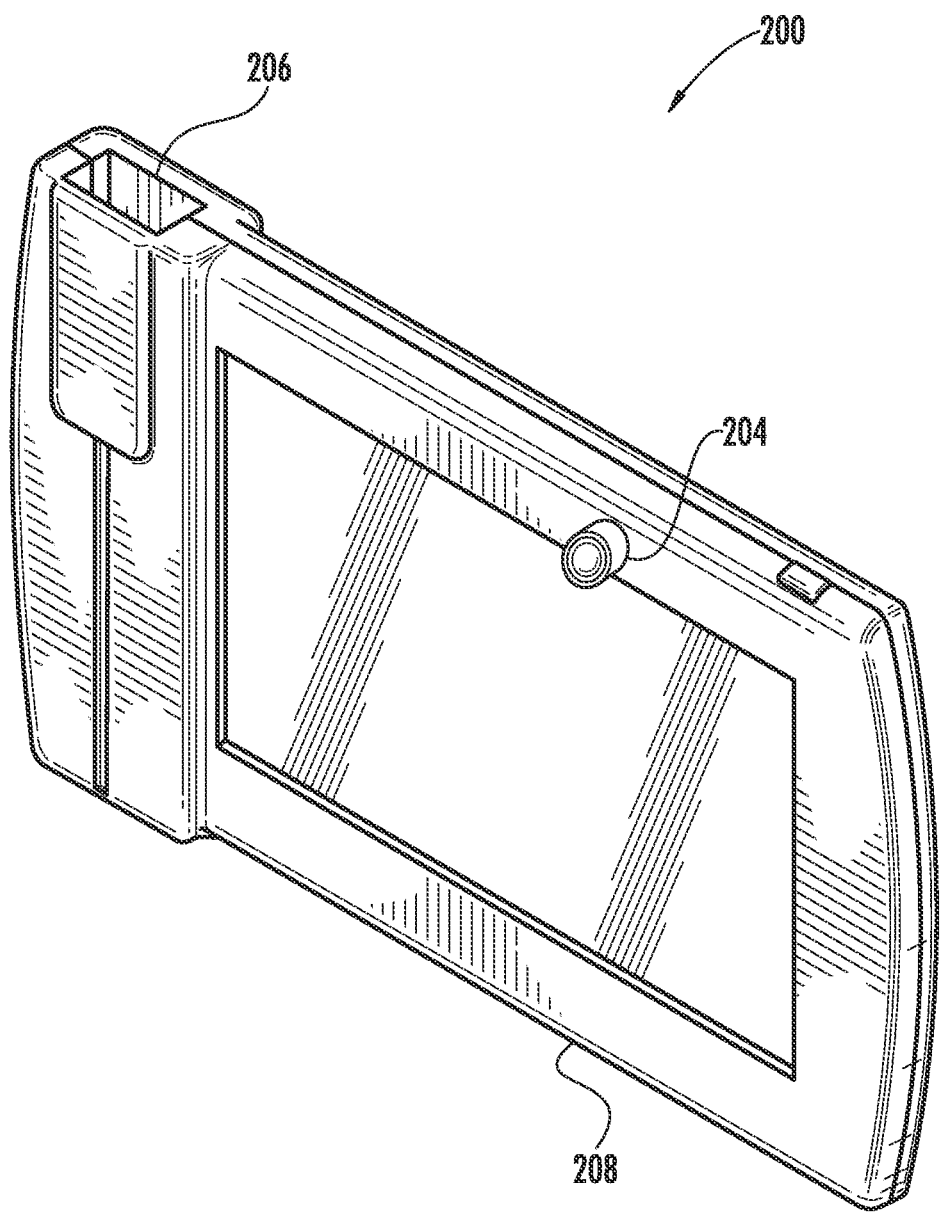
Figure 2E:
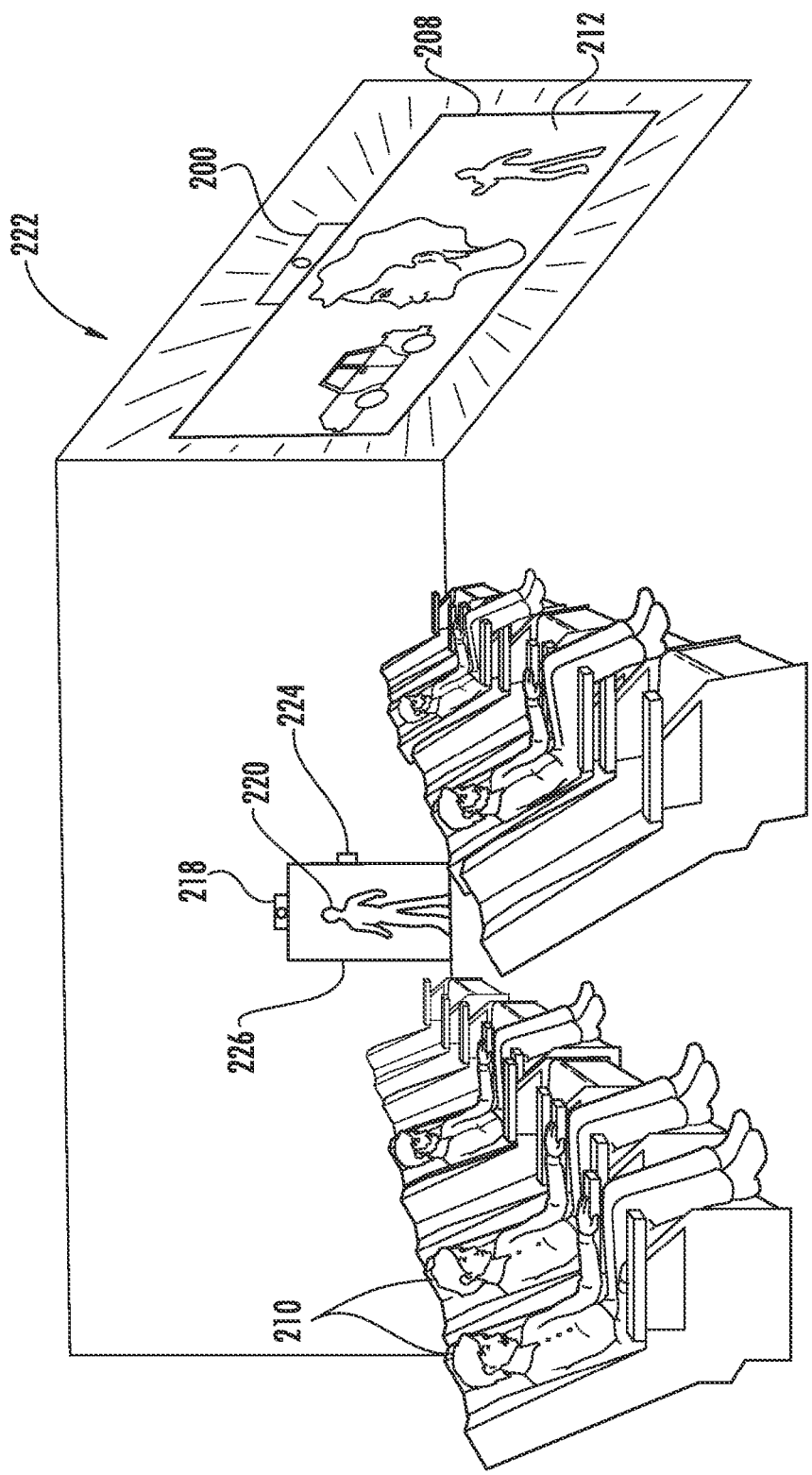

In some embodiments, at least one means for electronically connecting at least one broadcasting device to system 206 may include any such means, such as, but not limited to, an audio connection, such as a speaker connection, and/or a video connection, such as an HDMI, S-Video, or RCA connection, and the like. The broadcasting device 208 may be any kind of broadcasting device, such as a speaker system, headphones, a television (as shown in FIG. 2C), a computer screen, a projector and a screen (as shown in FIG. 2E), and the like.

The computer executable instructions may be loaded directly on the processor, or may be stored in a storage means, such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. The computer executable instructions may be any type of computer executable instructions, which may be in the form of a computer program, the program being composed in any suitable programming language or source code, such as C++, C, JAVA, JavaScript, HTML, XML, and other programming languages.

In one embodiment, the computer executable instructions may include object recognition software, such as image recognition software and/or firmware, which may be used to analyze the information (shown as 214 in FIG. 2C) captured by at least one sensor 204 and to determine the number of persons 210 present in the information 214, and consequently in the at least one sensor's 204 field of sensing 216. Such object recognition software may include image recognition software, which may, in turn, include facial recognition software, or may simply include general visual object recognition software. In one embodiment, the object recognition software may comprise 3D sensor middleware, which may include 3D gesture control and/or object recognition middle ware, such as those various embodiments produced and developed by Softkinetic S. A., 24 Avenue L. Mommaerts, Brussels, B-1140, Belgium, Microsoft Corp., One Microsoft Way, Redmond, Wash., USA, and Omek Interactive, 2 Hahar Street, Industrial Zone Har Tuv A, Ganir Center Beith Shemesh 99067, Israel.

In another embodiment, the object recognition software may be audio based, being able to distinguish objects (e.g. persons) that are producing certain audio (such as breathing, talking, etc.). In yet a further embodiment, the object recognition software may use a plurality of at least one sensor 204 to determine how many persons or the identity of a person that is capable of perceiving the content 212.

In some embodiments, the computer executable instructions may be further operative to control content 212 based on the number of persons 210 or the identity of a person 210 that is determined to be perceiving content 212. In a further embodiment, the computer executable instructions may be operative to control the content 212 being broadcasted if the number of persons 210 or the identity of a person determined to be perceiving the content 212 exceeds the number or identity of persons authorized to perceive the content. In some embodiments, controlling the content 212 being broadcasted includes, but is not limited to, ceasing to broadcast the content 212, pausing the content 212, playing the content 212, or continuing to display the content 212. In some embodiments, for example, if at the outset of the content's 212 broadcast, the number of persons 210 who are determined to be capable of perceiving exceeds the number of persons 210 authorized to perceive, the content 212 may not even begin being broadcasted. Likewise, in one embodiment, if at the outset of the content's 212 broadcast, the identity of a person 210 who is determined to be capable of perceiving content 212 does not correspond to the identity of a person who is authorized to perceive content 212, the content 212 may not even begin being broadcasted. In further embodiments, if the number of persons 210 or the identity of a person 210 capable of perceiving the content 212 at the outset is in accordance with the number of persons or identity of persons authorized to perceive the content 212, but at a later time exceeds the number or identity authorized, the computer executable instructions may pause, freeze, or cease broadcasting the content 212 altogether. In a further embodiment, if the number of persons 210 perceiving the content 212 at first exceeds the number authorized, but then later is reduced to or below the number authorized, the computer executable instructions may be operative to begin or continue broadcasting the content 212. Likewise, if the identity of a person 210 determined to be capable of perceiving the content at first does not correspond with an authorized identity, but then later does correspond with an authorized identity, the computer executable instructions may be operative to being or continue broadcasting the content 212. The content 212 may be any kind of content, such as, but not limited to, a movie, a television show, a sports broadcast, such as a sports event, news, educational content, a radio show, an audio book, music, a scent, a smell, and the like.

In another embodiment, the computer executable instructions may be operative to allow for the number or identity of authorized persons to be changed or added to. In one embodiment, if the number of persons 210 or the identity of persons 210 determined to be capable of perceiving content 212 does not correspond to the number or identity of persons authorized to perceive the content, the computer executable instructions may be operative to allow a person 210 to increase the number of persons authorized to perceive the content, or to add a person's identity to the identities authorized to perceive the content. Such an operation may be accomplished by bringing up an electronic menu on a broadcasting device, such as a display device, that prompts a person 210 to increase the number of persons authorized to perceive the content 212, or to add an identity of a person to the identities authorized to perceive the content. Alternatively, the computer executable instructions may be operative to allow a person 210 to decrease the number of persons authorized to perceive the content, or to remove a person's identity from the identities authorized to perceive the content, which may, in turn, cause the person 210 to be charged less for the content's 212 broadcast.

It should be noted that the use of the terms "perceive," "perceiving," "view," and "viewing," are not meant to create the limitation that the persons must be actually perceiving content, but merely that they are capable of perceiving content, such as by being in the same room as where the content may be played.

In further embodiments, system 200 comprises at least one means for communicating with a local device, wherein the means for communicating with the local device may be electronically connected to the at least one processor 202. In some embodiments, such means may include a Bluetooth module, a USB port, an infrared port, a network adapter, such as a Wi-Fi card, and the like. The local device may be any kind of device, such as a television, a computer, a remote control, a telephone, a portable digital assistant, and the like.

In yet another embodiment, system 200 further comprises at least one means for communicating with a remote station, wherein the means for communicating may be electronically connected to the at least one processor 202. In some embodiments, the means for communicating with a remote station may be any kind of means, such as, but not limited to, a wireless modem, such as a GSM modem, a wired modem, an Ethernet adapter, a Wi-Fi adapter, and the like. In some embodiments, the remote station may be a media service provider, such as, but not limited to, a television service provider, a movie provider, a sports media provider, a radio station, an internet provider, a television station, a server computer, and the like. In such embodiments, the computer executable instructions may be further operative to use the at least one means for communicating with a remote station to transmit or receive information to or from the remote station. The information may include media content, such as television shows, sports broadcasts, movies, music, radio shows, smells, scents, and the like. The information may also include the number or identity persons authorized to view the media content, viewer content, billing information, and software updates. In some embodiments, a person may use system 200 to select and/or download the media to be viewed, and may select the amount of persons authorized to watch the media.

In one embodiment, system 200 may be positioned on, in, or near a display device, such as a television or computer monitor (as shown in FIG. 2C), a projector, a projector screen (as shown in FIG. 2E). In other embodiments, system 200 may be positioned within, or integrated with a broadcasting device, such as a television, tablet computer (as shown in FIG. 2D), personal computer, laptop computer, radio, smell producer, and the like.

With reference now to FIG. 2E, a further embodiment is shown, wherein system 200 may be positioned within or may be a part of a theatre, such as, but not limited to, a movie theatre, a home theatre, an office theatre, a hotel theatre, a condominium theatre, an auditorium, a restaurant theatre, a personal computer theatre, and the like.

In yet another embodiment, system 200 may further comprise at least one occupancy sensor 218 operative to determine a number of persons 220 entering or leaving a space 222 where content 212 may be played. At least one occupancy sensor 218 may be any kind of occupancy sensor 218, such as, but not limited to, a motion sensor, and infrared sensor, an infrared motion sensor, and the like. In some embodiments, at least one occupancy sensor 218 may include a 3D sensor, such as a time of flight sensor or structured light sensor, which may include any of those various embodiments developed or produced by Optrima N V, Witherenstraat 4—1040 Brussels, Belgium; Prime Sense, 28 Habarzel St., $4^{th}$ Floor, Tel-Aviv, 69710, Israel; PMDTechnologies GmbH, Am Eichenlag 50, D-57076 Siegen, Germany; and Microsoft, Corp., One Microsoft Way, Redmond, Wash., USA. At least one occupancy sensor 218 may be used to determine how many persons 210 are capable of perceiving content 212. At least one occupancy sensor 218 may be electronically connected to and/or in electronic communication with at least one processor 202, at least one sensor 204, and/or at least one means 206 for electronically connecting at least one broadcasting device to system 200.

In a further embodiment, system 200 may comprise at least one means 224 for identifying a person 218 entering or leaving a space 222 where content 212 may be played. At least one means 224 for identifying a person 218, may include any kind of means for identifying a person, such as a biometric identifications means, such as, but not limited to, an eye scanner, a face scanner, a finger print scanner, a key reader, a card reader, a smart card reader, and the like. In some embodiments, at least one means 224 for identifying a person 218 may be used to determine the identity of persons 210 capable of perceiving content 212. At least one means 224 for identifying a person 218 may be electronically connected to and/or in electronic communication with at least one processor 202, at least one sensor 204, and/or at least one means 206 for electronically connecting at least one broadcasting device to system 200.

In yet a further embodiment, system 200 may comprise at least one means 226 for restricting access to a space 222 where content 212 may be played, wherein the restriction may be based on the number of persons or the identity of a person attempting to enter or leave space 222 where content 212 may be played. Means 226 for restricting access may be any kind of means for restricting access, such as a door, a lock, a turn style, a limited access elevator, a security guard, and the like. In some embodiments, at least one means 226 for restricting access to space 222 may be electronically connected to and/or in electronic communication with at least one processor 202, at least one sensor 204, and/or at least one means 206 for electronically connecting at least one broadcasting device to system 200

In another embodiment, a person may purchase authorization to perceive content 212 at a remote location, such as at home or in a hotel room, a remote terminal, online, or the like. The purchasing process may include identifying the number of person(s) or the identity of person(s) that will perceive the content 212. In some embodiments, at least one occupancy sensor 218 and/or at least one sensor 204 may be used to ensure that the number of persons 220 attempting to enter space 222 where content 212 may be played, or persons 210 that are capable of perceiving content 212, coincides with the number of persons identified during the purchase process. In another embodiment, at least one means 224 for identifying a person 220 and/or at least one sensor 204 may be used to ensure that the identity of a person 220 attempting to enter space 222, or person(s) 210 that are capable of perceiving content 212, coincides with the identity of person(s) identified during the purchase process.

In yet a further embodiment, if by any means, such as by using at least one sensor 204 and/or occupancy sensor 218, the number of persons 220 attempting to enter space 222, or the number of persons 210 that are capable of perceiving content 212 is determined to exceed the number of persons authorized to perceive content 212, the at least one means 226 for restricting access to space 222 may be used to prevent further entry into space 222, and/or content 212 may cease playing or pause. In yet a further embodiment, if by any means, such as by using at least one sensor 204 and/or at least one means 224 for identifying a person 220, the identity of a person 220 attempting to enter space 222, or the identity of a person 210 that is capable of perceiving content 212 is determined to not correspond with the identity of a person authorized to perceive content 212, the at least one means 226 for restricting access to space 222 may be used to prevent further entry into space 222, and/or content 212 may cease playing or pause. Likewise, if by any means, such as those described above, the number and/or identity of persons attempting to enter space 222 and/or persons capable of perceiving content 212 is determined to be within authorized limits, the at least one means 226 for restricting access to space 222 may be used to allow entry into space 222, and/or content 212 may begin playing or continue playing.

Throughout the present disclosure, it should be understood that computer executable instructions, such as those in system 200, may be used to manipulate and use the various embodiments of systems and components thereof, such as at least one sensor 204, at least one occupancy sensor 218, at least one means 224 for identifying a person 220, and/or at least one means for restricting access 226.

Figure 3:
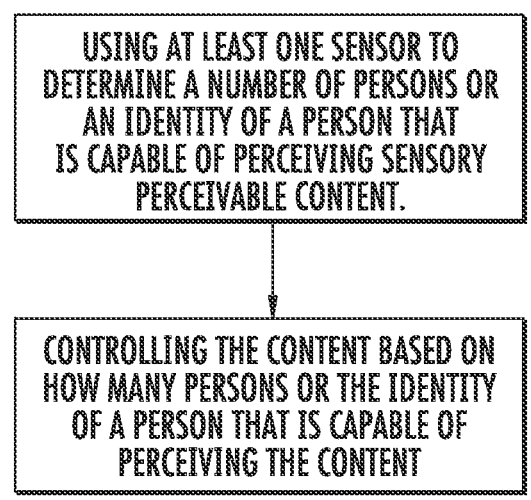
FIG. 3 shows a flow diagram representing a method in accordance with one embodiment.

Referring now to FIG. 3 shows a flow diagram representing an embodiment of method 300, wherein method 300 comprises using at least one sensor to determine the number of persons that are capable of perceiving sensory perceivable content (block 302), and controlling the content based on how many person(s) or the identity of person(s) that are determined to be capable of perceiving the content (block 304). In a further embodiment, method 300 comprises using a processor to carry out any and/or all of the steps of method 300 described above and elsewhere throughout the present disclosure.

In some embodiments, the sensor may be any kind of sensor, including, but not limited to, a visual sensor, an audio sensor, a tactile sensor, a thermal sensor, a chemical sensor, an electrical sensor, a capacitive sensor, a resistive sensor, a camera, 3D camera, an infrared camera, a thermal imaging camera, a microphone, any other type of sensor described herein, and the like. In some embodiments, at least one sensor may include a 3D sensor, such as a time of flight sensor or structured light sensor, which may include any of those various embodiments developed or produced by Optrima N V, Witherenstraat 4—1040 Brussels, Belgium; Prime Sense, 28 Habarzel St., $4^{th}$ Floor, Tel-Aviv, 69710, Israel; PMDTechnologies GmbH, Am Eichenlag 50, D-57076 Siegen, Germany; and Microsoft, Corp., One Microsoft Way, Redmond, Wash., USA.

In some embodiments, the sensory perceivable content may be audio content, such as music, dialogue, and the like, and/or visual content, such as images, text, movies, television shows, sports events, and the like. Alternatively, the content may be internet service. In some embodiments, the content may be tactile content, like vibrations or force feedback, while in other embodiments, the content may be perceived with the nose, such as smells, scents, and the like.

In a further embodiment of method 300, controlling the content based on how many person(s) or the identity of person(s) that are determined to be capable of perceiving the content comprises any or all of the following: pausing the content when the number of persons determined to be capable of perceiving the content exceeds a number of persons authorized to perceive the content, playing the content when the number of persons determined to be capable of perceiving the content is equal or less to the number of persons authorized to perceive the content, and ceasing the content when the number of persons determined to be capable of perceiving the content exceeds the number of persons authorized to perceive the content. In another embodiment of method 300, controlling the content based on how many person(s) or the identity of person(s) that are determined to be capable of perceiving the content comprises any or all of the following: pausing the content when the identity of person(s) determined to be capable of perceiving the content does not correspond with the identity of person(s) authorized to perceive the content, playing the content when the number of persons determined to be capable of perceiving the content corresponds with the identity of person(s) authorized to perceive the content, and ceasing the content when the identity of person(s) determined to be capable of perceiving the content does not correspond with the identity of person(s) authorized to perceive the content.

In a further embodiment, method 300 may be carried out in whole or in part, in a theatre, such as, but not limited to, a movie theatre, a home theatre, an office theatre, a hotel theatre, a condominium theatre, an auditorium, a restaurant theatre, a personal computer theatre, and the like.

In yet another embodiment, method 300 may further comprise using at least one occupancy sensor to determine a number of persons entering or leaving a space where the content may be played. The at least one occupancy sensor may be any kind of occupancy sensor, such as, but not limited to, a motion sensor, and infrared sensor, an infrared motion sensor, and the like. In some embodiments, the occupancy sensor may include a 3D sensor, such as a time of flight sensor or structured light sensor, which may include any of those various embodiments developed or produced by Optrima N V, Witherenstraat 4—1040 Brussels, Belgium; Prime Sense, 28 Habarzel St., 4$^{th}$ Floor, Tel-Aviv, 69710, Israel; PMDTechnologies GmbH, Am Eichenlag 50, D-57076 Siegen, Germany; and Microsoft, Corp., One Microsoft Way, Redmond, Wash., USA. The at least one occupancy sensor may be used to determine how many persons are capable of perceiving content. The at least one occupancy sensor may be electronically connected to and/or in electronic communication with at least one processor.

In a further embodiment, method 300 may comprise using at least one means for identifying a person entering or leaving a space where the content may be played. The at least one means for identifying a person, may include any kind of means for identifying a person, such as a biometric identifications means, such as, but not limited to, an eye scanner, a face scanner, a finger print scanner, a key reader, a card reader, a smart card reader, and the like. In some embodiments, the at least one means for identifying a person may be used to determine the identity of persons capable of perceiving the content. The at least one means for identifying a person may be electronically connected to and/or in electronic communication with at least one processor.

In yet a further embodiment, method 300 may comprise using at least one means for restricting access to a space where the content may be played, wherein the restriction may be based on the number of persons or the identity of a person attempting to enter or leave the space where the content may be played. The means for restricting access may be any kind of means for restricting access, such as a door, a lock, a turn style, a limited access elevator, a security guard, and the like.

In another embodiment, a person may purchase authorization to perceive the content at a remote location, such as at home or in a hotel room, a remote terminal, online, or the like. The purchasing process may include identifying the number of person(s) or the identity of person(s) that will perceive the content. In some embodiments, the at least one occupancy sensor and/or the at least one sensor may be used to ensure that the number of persons attempting to enter the space where the content may be played, or persons that are capable of perceiving the content, coincides with the number of persons identified during the purchase process. In another embodiment, the at least one means for identifying a person and/or the at least one sensor may be used to ensure that the identity of a person attempting to enter the space, or person(s) that are capable of perceiving the content, coincides with the identity of person(s) identified during the purchase process.

In yet a further embodiment, if by any means, such as by using the at least one sensor and/or the occupancy sensor, the number of persons attempting to enter the space, or the number of persons that are capable of perceiving the content is determined to exceed the number of persons authorized to perceive the content, the at least one means for restricting access to the space may be used to prevent further entry into the space, and/or the content may cease playing or pause. In yet a further embodiment, if by any means, such as by using the at least one sensor and/or the at least one means for identifying a person, the identity of a person attempting to enter the space, or the identity of a person that is capable of perceiving the content is determined to not correspond with the identity of a person authorized to perceive the content, the at least one means for restricting access to the space may be used to prevent further entry into the space, and/or the content may cease playing or pause. Likewise, if by any means, such as those described above, the number and/or identity of persons attempting to enter the space and/or persons capable of perceiving the content is determined to be within authorized limits, the at least one means for restricting access to the space may be used to allow entry into the space, and/or the content may begin playing or continue playing.

Throughout the present disclosure, it should be understood that computer executable instructions, such as those in method 300, may be used to manipulate and use the various embodiments of systems and components thereof, such as the at least one sensor, the at least one occupancy sensor, the at least one means for identifying a person, and/or the at least one means for restricting access.

In a further embodiment, method 300 comprises any or all of the following steps: allowing at least one person to register for at least one broadcast of at least one program, using at least one image recording means to capture at least one image of the at least one person, and using at least one processor to analyze the image and determine how many persons are in the image, and begin, continue, or cease broadcasting or displaying the program based on how many persons are determined to be in the image. In some embodiments, method 300 further comprises using at least one processor to begin broadcasting the program if the amount of persons determined to be in the image corresponds to the amount of persons registered for the broadcast.

In some embodiments, method 300 further comprises using at least one processor to continue broadcasting the program if the amount persons determined to be in the image corresponds to the amount of persons registered for the broadcast.

In some embodiments, method 300 further comprises using at least one processor to cease broadcasting the program if the amount persons determined to be in the image does not correspond to the amount of persons registered for the broadcast.

In some embodiments, method 300 further comprises using at least one processor to carry out any of the aforementioned steps, or any other steps described in the present disclosure.

In some embodiments, method 300 may be implemented as a computer readable medium having computer executable instructions. The term "computer readable medium," as used throughout this disclosure, may refer to any computer readable medium, such as CD-ROMs, CD-Rs, CD-RWs, floppy disks, hard drives, flash drives, diskettes, solid state drives, tape drives, and any other form of computer readable medium.

In some embodiments method 300 may be integrated wholly, or in part, into systems 100 and 200 described above, as well as other systems and methods described throughout the present disclosure. In some embodiments, method 300 may be carried out using the various systems described throughout the present disclosure.

Figure 4A:
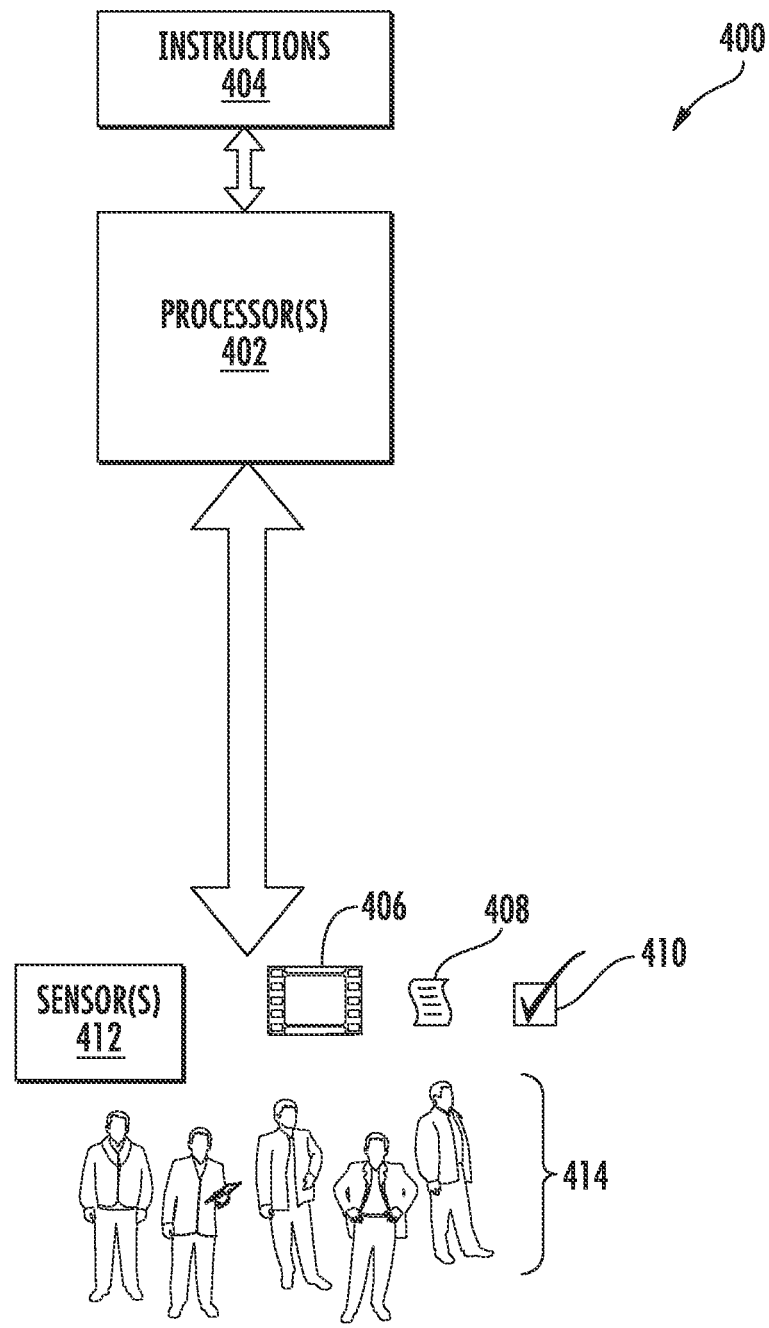
FIG. 4A shows a system in accordance with one embodiment.

Referring now to FIG. 4A a system 400 is shown in accordance with one embodiment, wherein system 400 may comprise at least one processor 402, and computer executable instructions 404 readable by the at least one processor 402 and operative to provide at least one piece of media content 406 for selection, provide at least one license 408 for selection, wherein the at least one license 408 is associated with the at least one piece of media content 406, receive a selection 410 of the at least one piece of media content 406 or the at least one license 408, use at least one sensor 412 to determine a number of persons 414 that are capable of perceiving the at least one piece of media content 406, and control the at least one piece of media content 406 based on the number of persons 414 that is determined to be capable of perceiving the at least one piece of media content 406, wherein controlling the at least one piece of media content 406 comprises any or all of the following: ceasing to play the at least one piece of media content 406, pausing the at least one piece of media content 406, playing the at least one piece of media content 406, or continuing to play the at least one piece of media content 406.

In some embodiments, the at least one processor 402 may comprise any type of processor, including, but not limited to, any or all of those embodiments described above with reference to FIGS. 1A through 3 or elsewhere in the present or previous disclosures. At least one processor 402 may be part of or connected to at least one display device, at least one broadcasting device, at least one remote station, which may include a media service or content provider 424, and any other broadcasting device or system described herein including, but not limited to, any or all of those embodiments described above with reference to FIGS. 1A through 3 or elsewhere in the present or previous disclosures.

Figure 4B:
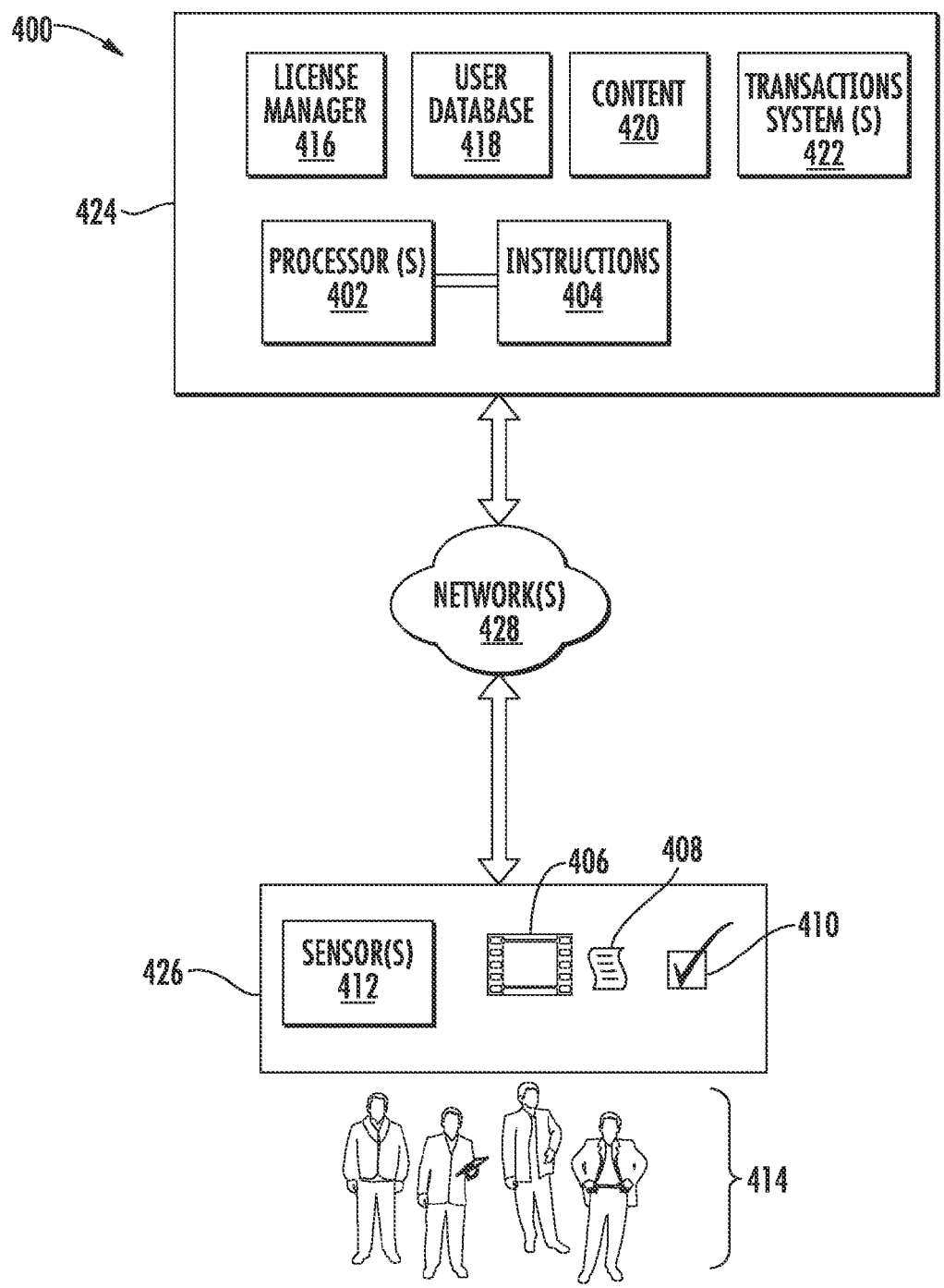
FIG. 4B shows a system in accordance with another embodiment.

Accordingly, in some embodiments, computer executable instructions 404 and/or at least one processor 402 may be operative to access a license manager 416, such as a license or digital rights management server or server component, including those embodiments similar to those embodiments provided by WIDEVINE™, a user database 418, media content 420 (which may include at least one piece of media content 406), and a transactions system, server, or server component 422, and the like, as shown in FIG. 4B, and collectively referred to as media service or content provider 424.

As previously explained, provider 424 (and any components thereof) may be operative to communicate with a client device 426, which may comprise or be connected to sensor(s) 412, and may be operative to provide content 406, license 408, and solicit selection 410 to or from at least one user. In some embodiments, provider 424 may be operative to communicate with client device 426 via at least one communications network 428, which may comprise a wide-area-network (WAN), wireless local area network (WLAN), cellular network, and any other embodiment thereof, including, but not limited to, any or all of those embodiments described above with reference to FIGS. 1A through 3 or elsewhere in the present or previous disclosures.

Computer executable instructions 404 may comprise any type of computer executable instructions, including, but not limited to, any or all of those embodiments described above with reference to FIGS. 1A through 3 or elsewhere in the present or previous disclosures.

At least one piece of media content 406 may comprise any type of media content, including, but not limited to, any or all of those embodiments described above with reference to FIGS. 1A through 3 or elsewhere in the present or previous disclosures. Media content 406 may comprise digital media content.

In some embodiments, at least one license 408 may comprise any type of license, including, but not limited to, any or all of those embodiments described above with reference to FIGS. 1A through 3 or elsewhere in the present or previous disclosures. In simplest terms, the term "license" may refer to an authorization to perceive media content 406, as used and referred to previously and throughout the present disclosure.

In some embodiments, license 408 may comprise digital rights management information, which may be associated with or embedded with at least one piece of media content 406. In some embodiments, license 408 may be issued and managed by provider 424, or by a distributor or creator of media content 406, which, in some embodiments, may be handled by license manager 416.

In another embodiment, at least one license 408 may comprise associated information, such as a set of parameters or authorizations associated with media content 406. In some embodiments, at least one license 408 may comprise a number of persons or identity of persons authorized (or not-authorized) to perceive at least one piece of media content 406. In another embodiment, license 408 may comprise a fee associated with license 408 or content 406. In some embodiments, the information associated or contained in license 406 may be accessed from a user database, which may contain user information, including, but not limited to, identity, financial information, geographic information, household size information, and the like.

Accordingly, in some embodiments, providing at least one license 408 for selection may comprise providing a number of persons or identity of persons authorized to perceive the at least one piece of media content 406 for selection, which may include, but is not limited to, any or all of those embodiments described above with reference to FIGS. 1A through 3 or elsewhere in the present or previous disclosures.

In some embodiments, computer executable instructions 404 may be operative to allow at least one user to modify the at least one license 408, which may include changing the number of persons 414 authorized to perceive media content 406, as well as other embodiments described previously or in the present disclosure.

In some embodiments, computer executable instructions 404 may be further operative to control the at least one piece of media content 406 if the number of persons 414 determined to be capable of perceiving the at least one piece of media content exceeds or does not correspond to the at least one license 408 (i.e. the number of persons 414 capable of perceiving media content 406 does not equal to or exceeds the number of persons 414 authorized to perceive media content 406).

In some embodiments, using at least one sensor 412 to determine a number of persons 414 that are capable of perceiving the at least one piece of media content 406 may comprise using at least one sensor 412 to sense at least one body part 428 of at least one person capable of perceiving the at least one piece of media content 406 (as shown in FIGS. 1C and 2C. As previously mentioned the computer executable instructions 404 may comprise objected recognition software or 3D gesture control or 3D image recognition software.

In some embodiments, the at least one body part may comprise at least one head, at least one eye, at least one ear, at least one nose, at least one mouth, at least one face, at least one arm, at least one chest, at least one hand, at least one torso, at least one leg, at least one article of clothing worn by the at least one body part, at least one heat signature of the at least one body part, at least one emission of the at least one body part, or at least one entire body to which the at least one body part is connected. Sensing person's bodies, as well as their individual body parts and emissions thereof may be advantageous in the event that part of a person's body is concealed from sensor(s) 412 behind clothing, furniture, other persons, or structures. Sensing the movement (or lack thereof) may also aid in distinguishing persons for persons of determining the number of persons 414. Furthermore, the computer executable instructions may be operative to use the sensor(s) 412 to distinguish persons from animals, small children from adults, and women from men, which may aid in ensuring and maintaining compliance with license 408.

In some embodiments, an emission of a body or body part may comprise a heat emission, a gas emission, such as breathing or flatulation, a liquid emission such as tears, mucus, or saliva, a radio emission, an audible emission, such as a voice, breathing or other noise, and the like. In some embodiments, it may be advantageous to use sensor(s) 412 to analyze heat signatures emanating from bodies, body parts, or emissions of persons 414 for purposes of distinguishing persons from other objects in the scene or environment, and consequently a more accurate determining of number of persons 414.

In one embodiments, using at least one sensor 412 to determine a number of persons 414 that are capable of perceiving the at least one piece of media content 406 comprises using at least one sensor 412 to determine a number of persons 414 that are capable of perceiving the at least one piece of media content 406 during at least one period of time or during a number of performances of the at least one piece of media content 406. In some embodiments, the number of persons 414 authorized to perceive media content 406 may be spread out over a period time or a number of performances of content 406.

As previously mentioned, license 408 may comprise a fee. Accordingly, in some embodiments, computer executable instructions may be operative to receive a payment of the fee or an authorization for payment of the fee. Such functions may be handled by transactions system 422, which may collect the fee from a user at the time a license is selected (or purchase), may automatically charge a user the fee (whose account information may be stored, such as in the user database), or deduct credits from a user's account or subscription.

In yet another embodiment, providing the at least one license 406 for selection comprises automatically selecting at least one license 408 associated with the at least one piece of content 406, or automatically selecting at least one license 408 associated with the number of persons 414 or identity of persons 414 capable of perceiving the at least one piece of media content 406. Automatically selecting at least one license 408 may comprise using sensor(s) 412 to determine a number or identity of persons 414, determining which license 408 corresponds to content 406, or number or identity of persons 414, and then selecting (and if necessary, charging a fee for) license 408. The automatic selection may be performed at the outset of content's 406 performance, during content's 406 performance, or after content's 406 performance. In some embodiments, automatically selecting a license may comprise automatically selecting a license if: (a) a user has previously authorized automatic license selection, (b) by default), (c) if no license has been selected (at all or in a given period of time), (d) if any of the conditions at the point of content's performance or consumption changes, such as number or identity of persons 414 changes after a license has been selected, and the like.

Figure 5:
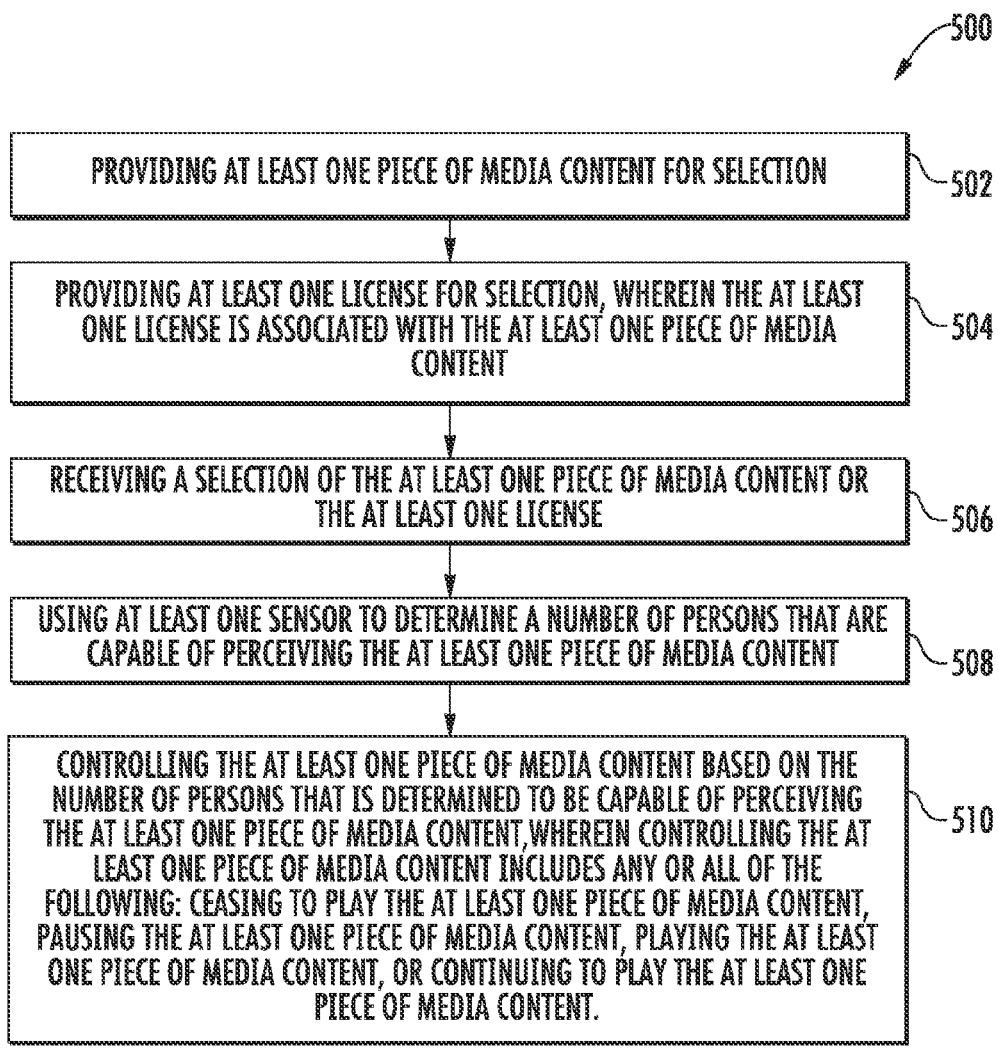
FIG. 5 shows a flow chart depicting a method in accordance with one embodiment.

Referring now to FIG. 5, a flow chart depicting a computer implemented method 500 is shown in accordance with one embodiment, wherein method 500 may comprise providing at least one piece of media content for selection (block 502), providing at least one license for selection (block 504), wherein the at least one license is associated with the at least one piece of media content, receiving a selection of the at least one piece of media content or the at least one license (block 506), using at least one sensor to determine a number of persons that are capable of perceiving the at least one piece of media content (block 508), and controlling the at least one piece of media content based on the number of persons that is determined to be capable of perceiving the at least one piece of media content, wherein controlling the at least one piece of media content includes any or all of the following: ceasing to play the at least one piece of media content, pausing the at least one piece of media content, playing the at least one piece of media content, or continuing to play the at least one piece of media content (block 510).

In some embodiments, providing at least one piece of media content for selection (block 502) may comprise those embodiments described previously and elsewhere throughout the present disclosure, including, but not limited to, any or all of those embodiments described above with reference to FIGS. 1A through 4B or elsewhere in the present or previous disclosures.

In some embodiments, providing at least one license for selection (block 504) may comprise those embodiments described previously and elsewhere throughout the present disclosure, including, but not limited to, any or all of those embodiments described above with reference to FIGS. 1A through 4B or elsewhere in the present or previous disclosures.

In some embodiments, receiving a selection of the at least one piece of media content or the at least one license (block 506) may comprise those embodiments described previously and elsewhere throughout the present disclosure, including, but not limited to, any or all of those embodiments described above with reference to FIGS. 1A through 4B or elsewhere in the present or previous disclosures.

In yet more embodiments, using at least one sensor to determine a number of persons that are capable of perceiving the at least one piece of media (block 508) content may comprise those embodiments described previously and elsewhere throughout the present disclosure, including, but not limited to, any or all of those embodiments described above with reference to FIGS. 1A through 4B or elsewhere in the present or previous disclosures.

In yet more embodiments, controlling the at least one piece of media content based on the number of persons that is determined to be capable of perceiving the at least one piece of media content (block 510) may comprise those embodiments described previously and elsewhere throughout the present disclosure, including, but not limited to, any or all of those embodiments described above with reference to FIGS. 1A through 4B or elsewhere in the present or previous disclosures.

Accordingly, method 500 may incorporate, be incorporated in, or use any or all elements of the various embodiments of systems and methods described here, including, but not limited to, the various embodiments of systems and methods described with reference to FIGS. 1A through 4B, or elsewhere in the present or previous disclosures (including previously related applications, which are incorporated by reference herein).

In yet another embodiment, method 500 may be carried out by computer executable instructions residing on a transitory or non-transitory computer readable medium.

Hardware and Operating Environment

This section provides an overview of example hardware and the operating environments in conjunction with which embodiments of the inventive subject matter may be implemented.

A software program may be launched from a computer readable medium in a computer-based system to execute function defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 6 below.

Figure 6:
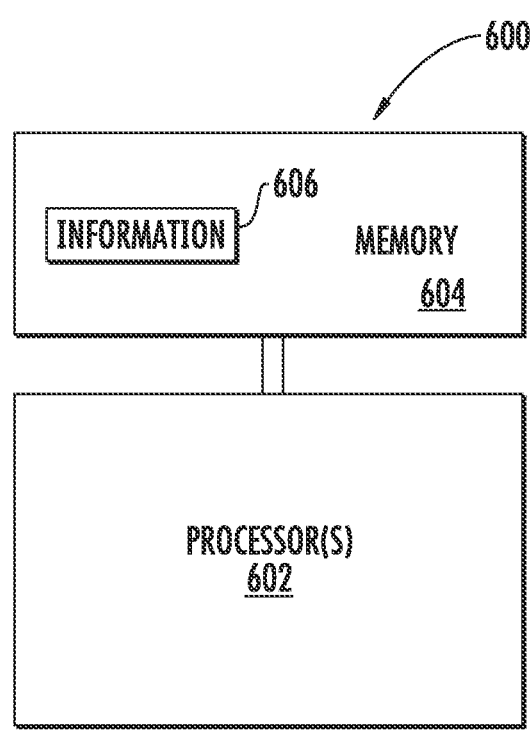
FIG. 6 shows block diagram representing an article in accordance with one embodiment.

FIG. 6 is a block diagram representing an article according to various embodiments. Such embodiments may comprise a computer, a memory system, a magnetic or optical disk, some other storage device, or any type of electronic device or system. The article 600 may include one or more processor(s) 602 coupled to a machine-accessible medium such as a memory 604 (e.g., a memory including electrical, optical, or electromagnetic elements). The medium may contain associated information 606 (e.g., computer program instructions, data, or both) which, when accessed, results in a machine (e.g., the processor(s) 602) performing the activities previously described herein.

The principles of the present disclosure may be applied to all types of computers, systems, and the like, include desktop computers, servers, notebook computers, personal digital assistants, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system comprising of:
   at least one processor; and
   computer executable instructions readable by the at least one processor and operative to:
   provide at least one piece of media content for selection;
   provide at least one license for selection, wherein the at least one license is associated with the at least one piece of media content;
   receive a selection of the at least one piece of media content or the at least one license;
   use at least one sensor to determine a number of persons that are capable of perceiving the at least one piece of media content;
   control the at least one piece of media content based on the number of persons that is determined to be capable of perceiving the at least one piece of media content, wherein controlling the at least one piece of media content comprises any or all of the following: ceasing to play or pausing the broadcast of at least one piece of media content when the number of persons determined to be capable of viewing the content is greater than the number of persons authorized to view the at least one piece of media content, playing or continuing to play the broadcast of at least one piece of media content when the number of persons determined to be capable of viewing the content is equal to or less than the number of persons authorized to view the broadcast of the at least one piece of media content;
   if the number of persons determined to be capable of viewing the content is greater than the number of persons authorized to view the at least one piece of media content, then engage a barrier to prevent entry to a physical space where said at least one piece of media content may be played.

2. The system of claim 1, wherein the at least one license comprises a number of persons or identity of persons authorized to perceive the at least one piece of media content.

3. The system of claim 1, wherein providing at least one license for selection comprises providing a number of persons or identity of persons authorized to perceive the at least one piece of media content for selection.

4. The system of claim 1, wherein the computer executable instructions are operative to allow at least one user to modify the at least one license.

5. The system of claim 1, wherein the computer executable instructions are further operative to control the at least one piece of media content if the number of persons determined to be capable of perceiving the at least one piece of media content exceeds or does not correspond to the at least one license.

6. The system of claim 5, wherein the computer executable instructions are operative to allow at least one user to modify the at least one license if the number of persons determined to be capable of perceiving the at least one piece of media content exceeds or does not correspond to the at least one license.

7. The system of claim 1, wherein using at least one sensor to determine a number of persons that are capable of perceiving the at least one piece of media content comprises using at least one sensor to sense at least one body part of at least one person capable of perceiving the at least one piece of media content.

8. The system of claim 7, wherein the at least one body part comprises:
   at least one head;
   at least one eye;
   at least one ear;
   at least one nose;
   at least one mouth;
   at least one face;
   at least one arm;
   at least one chest;
   at least one hand;
   at least one torso;
   at least one leg;
   at least one article of clothing worn by the at least one body part;
   at least one heat signature of the at least one body part;
   at least one emission emitted by at least one body party;
   or at least one entire body to which the at least one body part is connected.

9. The system of claim 1, wherein using at least one sensor to determine a number of persons that are capable of perceiving the at least one piece of media content comprises using at least one sensor to determine a number of persons that are capable of perceiving the at least one piece of media content during at least one period of time or during a number of performances of the at least one piece of media content.

10. The system of claim 1, wherein the at least one license comprises a fee.

11. The system of claim 1, wherein the barrier comprises a means for restricting access to the space.

12. The system of claim 1, wherein providing the at least one license for selection comprises automatically selecting at least one license associated with the at least one piece of content, or automatically selecting at least one license associated with the number of persons or identity of persons capable of perceiving the at least one piece of media content.

13. A computer implemented method comprising the steps of:
    providing at least one piece of media content for selection;
    providing at least one license for selection, wherein the at least one license is associated with the at least one piece of media content;
    receiving a selection of the at least one piece of media content or the at least one license;
    using at least one sensor to determine a number of persons that are capable of perceiving the at least one piece of media content;
    controlling the at least one piece of media content based on the number of persons that is determined to be capable of perceiving the at least one piece of media content, wherein controlling the at least one piece of media content includes any or all of the following: ceasing to play or pausing the broadcast of at least one piece of media content when the number of persons determined to be capable of viewing the content is greater than the number of persons authorized to view the at least one piece of media content, playing or continuing to play the broadcast of at least one piece of media content when the number of persons determined to be capable of viewing the content is equal to or less than the number of persons authorized to view the broadcast of the at least one piece of media content;
    if the number of persons determined to be capable of viewing the content is greater than the number of persons authorized to view the at least one piece of media content, then engaging a barrier to prevent entry to a physical space where said at least one piece of media content may be played.

14. The method of claim 13, wherein providing at least one license for selection comprises providing a number of persons or identity of persons authorized to perceive the at least one piece of media content for selection.

15. The method of claim 13, further comprising allowing at least one user to modify the at least one license.

16. The method of claim 13, further comprising allowing at least one user to modify the at least one license if the number of persons determined to be capable of perceiving the at least one piece of media content exceeds or does not correspond to the at least one license.

17. The method of claim 13, wherein using at least one sensor to determine a number of persons that are capable of perceiving the at least one piece of media content comprises using at least one sensor to sense at least one body part of at least one person capable of perceiving the at least one piece of media content, or sense an emission of the at least one body part.

18. The method of claim 13, wherein using at least one sensor to determine a number of persons that are capable of perceiving the at least one piece of media content comprises using at least one sensor to determine a number of persons that are capable of perceiving the at least one piece of media content during at least one period of time or during a number of performances of the at least one piece of media content.

19. The method of claim 13, further comprising receiving a payment of a fee or an authorization for payment of a fee.

20. The method of claim 13, wherein providing the at least one license for selection comprises automatically selecting at least one license associated with the at least one piece of content, automatically selecting at least one license associated with the number of persons or identity of persons capable of perceiving the at least one piece of media content.

21. A non-transitory computer readable medium having computer executable instructions for performing a method comprising the steps of:
    providing at least one piece of media content for selection;
    providing at least one license for selection, wherein the at least one license is associated with the at least one piece of media content;
    receiving a selection of the at least one piece of media content or the at least one license;
    using at least one sensor to determine a number of persons that are capable of perceiving the at least one piece of media content;
    controlling the at least one piece of media content based on the number of persons that is determined to be capable of perceiving the at least one piece of media content, wherein controlling the at least one piece of media content includes any or all of the following: ceasing to play or pausing the broadcast of at least one piece of media content when the number of persons determined to be capable of viewing the content is greater than the number of persons authorized to view the at least one piece of media content, playing or continuing to play the broadcast of at least one piece of media content when the number of persons determined to be capable of viewing the content is equal to or less than the number of persons authorized to view the broadcast of the at least one piece of media content;
    if the number of persons determined to be capable of viewing the content is greater than the number of persons authorized to view the at least one piece of media content, then engaging a barrier to prevent entry to a physical space where said at least one piece of media content may be played.

* * * * *